United States Patent
He

(10) Patent No.: US 10,671,191 B2
(45) Date of Patent: Jun. 2, 2020

(54) WRITING PEN AND METHOD FOR GENERATING FINGERPRINT INFORMATION

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Ru He, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 192 days.

(21) Appl. No.: 15/859,744

(22) Filed: Jan. 2, 2018

(65) Prior Publication Data

US 2018/0314348 A1 Nov. 1, 2018

(30) Foreign Application Priority Data

Apr. 26, 2017 (CN) .......................... 2017 1 0281179

(51) Int. Cl.

| G06K 9/20 | (2006.01) |
|---|---|
| G06F 3/038 | (2013.01) |
| G06F 3/0354 | (2013.01) |
| G06K 9/00 | (2006.01) |
| B43K 7/10 | (2006.01) |
| G06K 9/22 | (2006.01) |

(52) U.S. Cl.
CPC .............. *G06F 3/0383* (2013.01); *B43K 7/10* (2013.01); *G06F 3/03545* (2013.01); *G06K 9/0002* (2013.01); *G06K 9/00154* (2013.01); *G06K 9/00402* (2013.01); *G06K 9/22* (2013.01); *G06F 2203/0381* (2013.01)

(58) Field of Classification Search
CPC . G06K 9/22–24; G06K 9/00006–0012; G06K 9/00154–00194; G06F 3/03545–03546; G06F 2203/0381
USPC .................................................. 382/115–127
See application file for complete search history.

(56) References Cited

U.S. PATENT DOCUMENTS

| 5,103,486 A * | 4/1992 | Grippi ................ G06K 9/00006 382/116 |
|---|---|---|
| 7,197,174 B1 * | 3/2007 | Koizumi ............ G06K 9/00154 382/139 |
| 2016/0291956 A1 * | 10/2016 | Hargreaves ............... G06F 8/65 |
| 2018/0173330 A1 * | 6/2018 | Lee ........................ G06F 3/0416 |

* cited by examiner

*Primary Examiner* — Brian Werner
(74) *Attorney, Agent, or Firm* — ScienBiziP, P.C.

(57) ABSTRACT

A writing pen includes at least one processor, a fingerprint acquiring device, and an information generating device. The fingerprint acquiring device is arranged on a surface of the pen, the information generating device is arranged within the writing pen. Magnetic ink is in the writing pen. The fingerprint acquiring device takes a fingerprint when the user grips the writing pen, the processor acquires the fingerprint information and generates an electric signal reflecting the fingerprint information. The signal is transmitted to the information generating device, the information generating device imparts the fingerprint information to the magnetic ink, thus handwriting written by the writing pen with the magnetic ink records the fingerprint information of the user.

10 Claims, 3 Drawing Sheets

WRITING PEN AND METHOD FOR GENERATING FINGERPRINT INFORMATION

CROSS-REFERENCE TO RELATED APPLICATIONS

This application claims priority to Chinese Patent Application No. 201710281179.6 filed on Apr. 26, 2017, the contents of which are incorporated by reference herein.

FIELD

The subject matter herein generally relates to fingerprint identification technology, and particularly to a writing pen and a method for generating fingerprint information.

BACKGROUND

Handwriting and written signatures are usually used for users to confirm some documents, such as debt evidences, contracts etc. However, a signature is usually written on a paper by a pen, so that the signature may be easily copied or imitated.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
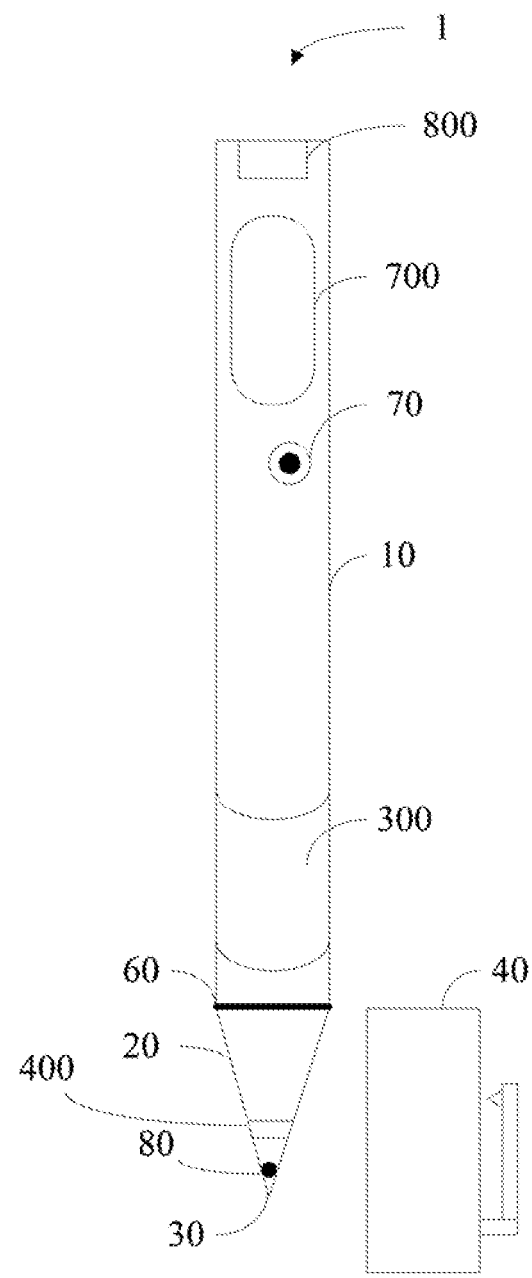
FIG. 1 is a schematic view illustrating an exemplary embodiment of a writing pen.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 2:
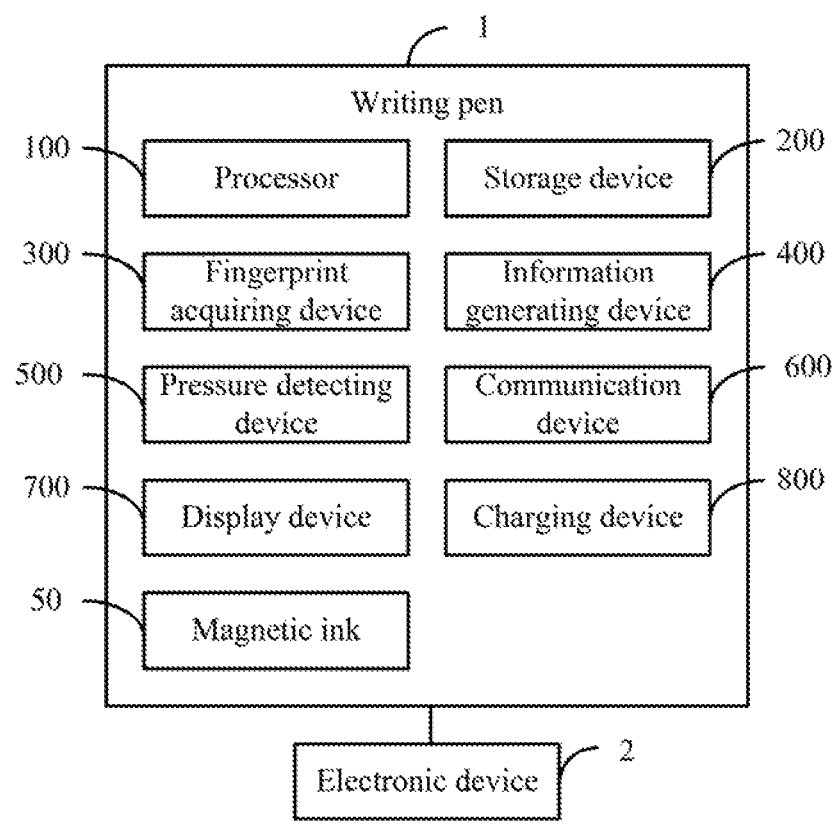
FIG. 2 is a block diagram illustrating an exemplary embodiment of the writing pen of FIG. 1.

FIG. 1 illustrates an exemplary embodiment of a writing pen 1. The writing pen 1 includes, but is not limited to, a pen body 10, a pen head 20, a pen nib 30, and a pen cap 40. The pen head 20 is arranged on an end of the pen body 10. The pen nib 30 is arranged on an end of the pen head 20. The pen cap 40 sheathes the pen head 20. Magnetic ink 50 (as shown in FIG. 2) is placed within the writing pen 1. In at least one exemplary embodiment, the magnetic ink 50 has a information storage function, thus, the information stored in the magnetic ink 50 can be recorded in handwriting written by the writing pen 1 with the magnetic ink 50.

Referring to FIG. 2, the writing pen 1 further includes, but is not limited to, a processor 100, a storage device 200, a fingerprint acquiring device 300, and an information generating device 400. FIGS. 1-2 illustrate only one example of the writing pen 1, other examples can include more or fewer components than illustrated, or have a different configuration of the various components in other embodiments.

In at least one exemplary embodiment, the processor 100 and the storage device 200 are arranged in the pen body 10. The storage device 200 can include various types of non-transitory computer-readable storage mediums. For example, the storage device 200 can be an internal storage system, such as a flash memory, a random access memory (RAM) for temporary storage of information, and/or a read-only memory (ROM) for permanent storage of information. The storage device 200 can also be an external storage system, such as a hard disk, a storage card, or a data storage medium. The processor 100 can be a central processing unit (CPU), a microprocessor, or other data processor chip that performs functions of the writing pen 1.

In at least one exemplary embodiment, the fingerprint acquiring device 300 is arranged on a surface of the pen body 10. The fingerprint acquiring device 300 can be an RF (Radio Frequency) fingerprint sensor. The fingerprint acquiring device 300 acquires fingerprint information of at least one finger of a user when the user grips the writing pen 1, and stores the acquired fingerprint information to the storage device 200.

The processor 100 acquires the fingerprint information from the storage device 200, generates an electric signal which can reflect the fingerprint information by processing the fingerprint information, and transmits the electric signal to the information generating device 400.

In at least one exemplary embodiment, the information generating device 400 is arranged in the pen head 20. The information generating device 400 can be a magnetic coil. The information generating device 400 generates the fingerprint information in the magnetic ink 50, the handwriting written by the writing pen 1 with the magnetic ink 50 can thus record the fingerprint information, that is, the fingerprint information of the user is carried by the magnetic ink 50.

In at least one exemplary embodiment, a major ingredient of the magnetic ink 50 is magnetic pigment, such as black iron oxide ($Fe_3O_4$) or brown iron oxide ($Fe_2O_3$). The magnetic pigment is an acicular crystal, a diameter of each acicular crystal is less than one micron. The magnetic pigment can be evenly arrayed in a magnetic field and can gain strong residual magnetism, which is convenient for recording relevant information.

When receiving the electric signal reflecting the fingerprint information, the information generating device 400 generates a magnetic field corresponding to the electric signal. The fingerprint information can thus be imparted onto the magnetic field. Then the magnetic ink 50 is magnetized and evenly arrayed in the magnetic field, and gains the residual magnetism, the fingerprint information is thus generated in the magnetic ink 50. The handwriting written by the writing pen 1 with the magnetic ink 50 can record the fingerprint information, that is, the fingerprint information of the user is carried by the magnetized magnetic ink 50.

In at least one exemplary embodiment, when the user writes on a medium (e.g., a paper) by the writing pen 1, whole fingerprint information can be recorded at predetermined lengths (e.g., five millimeters) of a length of the handwriting (i.e., a signature). For example, suppose that the overall length of the signature is equal to 5 predetermined lengths, i.e., 25 millimeters, there are 5 pieces of fingerprint information to which handwriting can be recorded. Thus, when the user is writing on the medium, 5 pieces of fingerprint information are output, that is, when each predetermined lengths (e.g., five millimeters) of the overall length of the handwriting is being written, a piece of fingerprint information is output.

In addition, the magnetic ink 50 has a memory function. When the overall length of the handwriting is not an integer multiple of the predetermined lengths, for example, the length of the handwriting is 12.5 millimeters, there are 2.5 pieces of fingerprint information, that is, there are 2.5 millimeters of the handwriting which records incomplete fingerprint information (0.5 piece of fingerprint information). The magnetic ink 50 outputs the incomplete fingerprint information (i.e., 0.5 piece of fingerprint information) as the handwriting is being done, and resumes output of the other 0.5 piece of fingerprint information when a new piece of handwriting is being written.

As illustrated in FIG. 2, the writing pen 1 further includes a pressure detecting device 500. In at least one exemplary embodiment, the pressure detecting device 500 can be a pressure sensor, the pressure detecting device 500 is arranged under the fingerprint acquiring device 300. The pressure detecting device 500 detects a grip strength when the user grips the writing pen 1, and transmits the detected grip strength to the processor 100.

The processor 100 further converts the detected grip strength to an electric signal, and controls output of the magnetic ink 50 accordingly when the user writes according to the electric signal reflecting the grip strength. Distribution of the fingerprint information is thus controlled. In at least one exemplary embodiment, the processor 100 converts the grip strength to the electric signal reflecting the grip strength by analog-digital conversion and pulse width modulation.

In another exemplary embodiment, the storage device 200 pre-stores a relationship between the grip strength and the output of the magnetic ink 50. For example, when the detected grip strength is in a first predefined range (indicating a light grip), the processor 100 controls the output of the magnetic ink 50 when writing to be a first value. When the detected grip strength is in a second predefined range (indicating strong or heavy grip), the processor 100 controls the output of the magnetic ink 50 to be a second value during writing.

The writing pen 1 further includes a communication device 600. In at least one exemplary embodiment, the communication device 600 can be a BLUETOOTH module or a WI-FI module. The writing pen 1 can communicate with an electronic device 2 through the communication device 600.

The processor 100 further acquires device information of the electronic device 2 and fingerprint information of various users pre-stored in the electronic device 2, when the writing pen 1 communicates with the electronic device 2. In at least one exemplary embodiment, the device information includes, but is not limited to, IMEI (International Mobile Equipment Identity) number, MAC (Media Access Control) address, location information, and time and date information.

In at least one exemplary embodiment, the processor 100 converts the device information and the fingerprint information of the user to an electric signal by encoding processing. The processor 100 further transmits the electric signal reflecting the device information and fingerprint information of the user to the information generating device 400. The information generating device 400 further generates the device information and fingerprint information of the user in the magnetic ink 50, the handwriting written by the writing pen 1 with the magnetic ink 50 can thus record the device information and fingerprint information of the user.

The writing pen 1 further includes a display device 700 and a charging device 800. In at least one exemplary embodiment, the display device 700 can be a LCD (Liquid Crystal Display) display, which is arranged on the pen body 10, and is used for displaying a state of the writing pen 1. The state of the writing pen 1 at least includes a standby state, a working state, and a shut down state. In addition, the display device 700 further displays a character "OK" to indicate that fingerprint of the user is acquired, and displays a character "FAIL" to indicate that the user fingerprint is not acquired. The overall length of the user's handwriting and the number of the pieces of fingerprint information recorded in the handwriting can also be displayed on the display device 700. The charging device 800 can be a charging port, which is arranged on an end away from the pen nib 30, and is used for charging the writing pen 1.

The writing pen 1 further includes a power switch 60, a reset switch 70, and a trigger switch 80. The power switch 60 is arranged on a joint of the pen body 10 and the pen nib 30. In at least one exemplary embodiment, when the pen cap 40 sheathes the pen head 20, the power switch 60 turns off power of the writing pen 1. When the pen cap 40 is taken out off the pen head 20, the power switch 60 turns on the power of the writing pen 1.

The reset switch 70 is arranged on the pen body 10. When the user activates the reset switch 70, the writing pen 1 is formatted, that is, the fingerprint information stored in the storage device 200 and the magnetic ink 50 is removed. The trigger switch 80 is arranged in the pen nib 30, the trigger switch 80 can be activated when being pressed, and can output the magnetic ink 50 on any medium which is markable by the writing pen 1.

Figure 3:
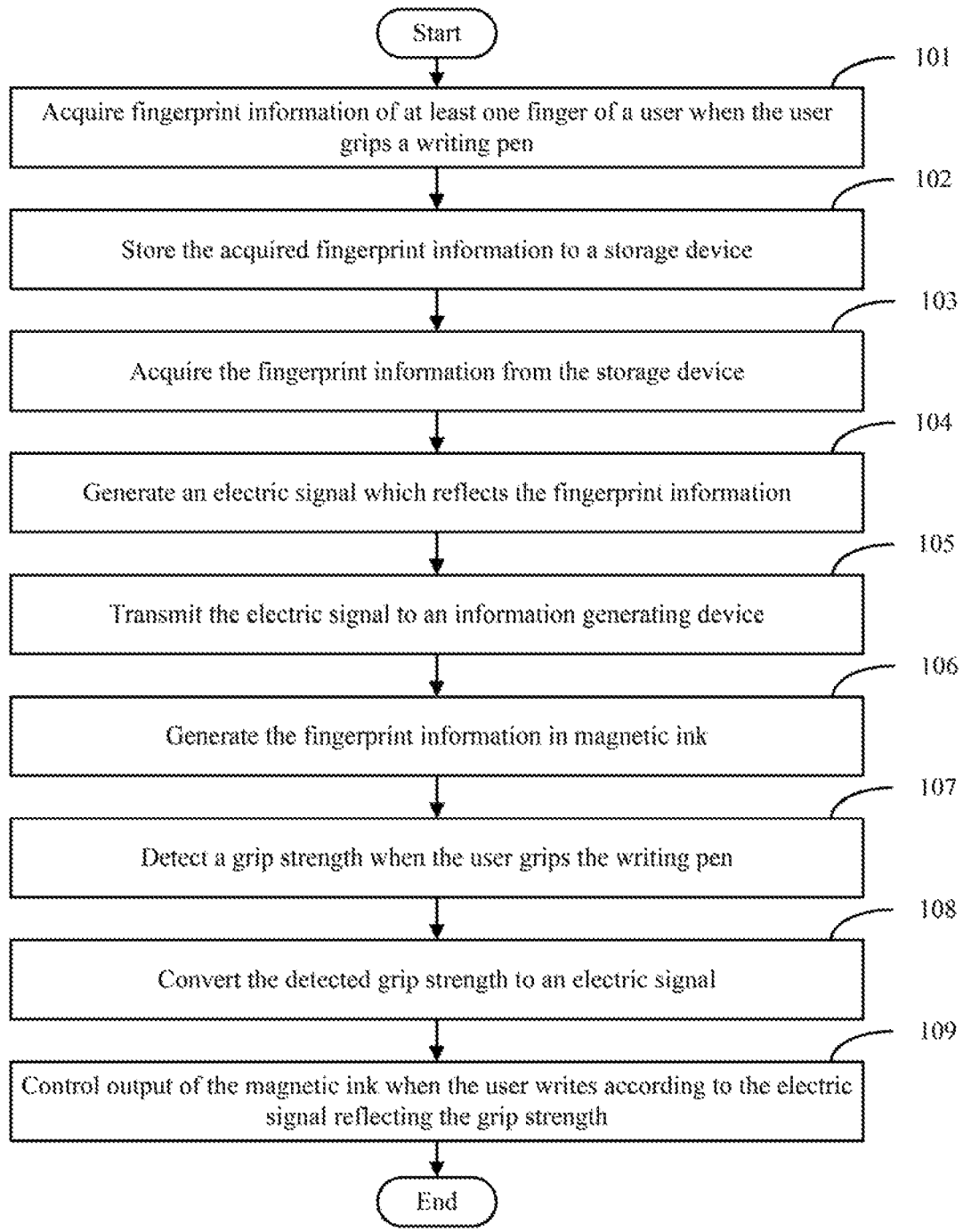
FIG. 3 illustrates a flowchart of an exemplary embodiment of a method for generating fingerprint information.

FIG. 3 illustrates a flowchart of an exemplary embodiment of a method for generating fingerprint information. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, a fingerprint acquiring device acquires fingerprint information of at least one finger of a user when the user grips a writing pen.

At block 102, the fingerprint acquiring device further stores the acquired fingerprint information to a storage device.

At block 103, a processor acquires the fingerprint information from the storage device.

At block 104, the processor further generates an electric signal which reflects the fingerprint information by processing the fingerprint information.

At block 105, the processor further transmits the electric signal to an information generating device.

At block 106, the information generating device generates the fingerprint information in the magnetic ink, handwriting written by the writing pen with the magnetic ink can thus record the fingerprint information of the user.

At block 107, a pressure detecting device detects a grip strength when the user grips the writing pen.

At block 108, the processor further converts the detected grip strength to an electric signal.

At block 109, the processor further controls output of the magnetic ink when the user writes according to the electric signal reflecting the grip strength.

In at least one exemplary embodiment, the method further includes the processor acquiring device information and pre-stored fingerprint information of various users in an electronic device, when the writing pen communicates with the electronic device. The processor transmits the electric signal reflecting the device information and the fingerprint information of the user to the information generating device. The information generating device generates the device information and the fingerprint information of the user in the magnetic ink, the handwriting written by the writing pen with the magnetic ink can thus record the device information and the fingerprint information of the user.

The handwriting written by the writing pen can record the user fingerprint information and the relevant information of electronic devices, thus, the handwriting has high security and is difficult to be copied or imitated.

When the user needs to identify the handwriting, an identification device (not shown) can be applied to scan the handwriting, and compare the scanned fingerprint information with the pre-stored user fingerprint information, if matching rate is greater than or equal to 99 percent, the handwriting to be identified is valid, if the matching rate is less than 99 percent, the handwriting to be identified is not valid.

At the same time, the identification device can further analyze the device information of the electronic device of the user, and determine whether the scanned fingerprint information and the analyzed device information is matched.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A writing pen comprising:
at least one processor;
a fingerprint acquiring device arranged on a surface of the writing pen and coupled to the at least one processor;
a pressure detecting device arranged under the fingerprint acquiring device and coupled to the at least one processor; and
an information generating device arranged in the writing pen and coupled to the at least one processor, wherein magnetic ink is placed within the writing pen, the fingerprint acquiring device acquires fingerprint information of at least one finger of a user when the user grips the writing pen, the at least one processor generates an electric signal which reflects the fingerprint information, and transmits the electric signal to the information generating device, the information generating device generates the fingerprint information in the magnetic ink, thus handwriting written by the writing pen with the magnetic ink records the fingerprint information, the pressure detecting device detects a grip strength when the user grips the writing pen, the at least one processor further converts the detected grip strength to an electric signal, and controls output of the magnetic ink when the user writes according to the electric signal reflecting the grip strength.

2. The writing pen according to claim 1, wherein the information generating device is a magnetic coil, when receiving the electric signal reflecting the fingerprint information, the information generating device generates a magnetic field corresponding to the electric signal, the fingerprint information is imparted onto the magnetic field, then the magnetic ink is magnetized and gains residual magnetism, the fingerprint information is thus generated in the magnetic ink.

3. The writing pen according to claim 1, further comprising:
a communication device communicating with an electronic device, wherein the at least one processor further acquires device information and pre-stored user fingerprint information of the electronic device when the writing pen communicates with the electronic device, and transmits the electric signal reflecting the device information and user fingerprint information to the information generating device, the information generating device generates the device information and user fingerprint information in the magnetic ink, thus the handwriting written by the writing pen with the magnetic ink records the device information and fingerprint information of the user.

4. The writing pen according to claim 1, further comprising:
a display device used for displaying a state of the writing pen, and
a charging device used for charging the writing pen.

5. The writing pen according to claim 1, further comprising:
a pen body, a pen head, a pen nib, and a pen cap, wherein the pen head is arranged on an end of the pen body, the pen nib is arranged on an end of the pen head, the pen cap sheathes on the pen head.

6. The writing pen according to claim 5, further comprising:
a power switch arranged on a joint of the pen body and the pen nib, wherein when the pen cap sheathes on the pen head, the power switch turns off power of the writing pen, when the pen cap is taken out off the pen head, the power switch turns on the power of the writing pen; and
a reset switch arranged on the pen body, wherein when the reset switch is activated, the information stored in the writing pen is formatted.

7. The writing pen according to claim 5, further comprising:
a trigger switch arranged in the pen nib, wherein the trigger switch is activated when being pressed, and the pen nib outputs the magnetic ink on any medium which is markable by the writing pen.

8. A method for generating fingerprint information comprising:
acquiring fingerprint information of at least one finger of a user when the user grips a writing pen;
generating an electric signal which reflects the fingerprint information;
transmitting the electric signal to an information generating device of the writing pen;
generating the fingerprint information in magnetic ink of the writing pen, wherein the fingerprint information is thus recorded in the handwriting written by the writing pen;
detecting a grip strength when the user grips the writing pen by a pressure detecting device of the writing pen, wherein the pressure detecting device is arranged under a fingerprint acquiring device of the writing pen;
converting the detected grip strength to an electric signal; and
controlling output of the magnetic ink when the user writes according to the electric signal reflecting the grip strength.

9. The method according to claim 8, further comprising:
acquiring device information and pre-stored user fingerprint information of an electronic device when the writing pen communicates with the electronic device; and
generating the device information and user fingerprint information in the magnetic ink, thus the handwriting written by the writing pen with the magnetic ink records the device information and user fingerprint information of the user.

10. The method according to claim 8, wherein the step of generating the fingerprint information in the magnetic ink comprises:
generating a magnetic field corresponding to the electric signal;
imparting the fingerprint information onto the magnetic field;
magnetizing the magnetic ink; and
generating the fingerprint information in the magnetic ink.

* * * * *